(12) United States Patent
Dabholkar et al.

(10) Patent No.: US 9,102,293 B2
(45) Date of Patent: Aug. 11, 2015

(54) APPARATUS AND METHOD FOR REDUCING FALSE ALARMS IN STOLEN VEHICLE TRACKING

(75) Inventors: Harsha Dabholkar, Libertyville, IL (US); Robert F. D'Avello, Lake Zurich, IL (US); Michael Cruz, Buffalo Grove, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 605 days.

(21) Appl. No.: 12/643,889

(22) Filed: Dec. 21, 2009

(65) Prior Publication Data

US 2011/0148609 A1    Jun. 23, 2011

(51) Int. Cl.
*B60R 25/20* (2013.01)
*B60R 25/10* (2013.01)

(52) U.S. Cl.
CPC ............ *B60R 25/10* (2013.01); *B60R 25/2072* (2013.01)

(58) Field of Classification Search
CPC ...... B60R 25/102; B60R 25/00; B60R 25/10; B60R 25/2072; G08G 1/205; G08G 1/207; G01S 5/0027; G01S 19/42; G08B 23/00; G08B 25/00; G08B 29/185
USPC .............. 340/988–994, 539.1–539.22, 426.1, 340/427–430, 426.11–426.21; 342/457
See application file for complete search history.

(56) References Cited

U.S. PATENT DOCUMENTS

| | | | | |
|---|---|---|---|---|
| 3,961,323 A * | 6/1976 | Hartkorn | ..................... | 340/539.1 |
| 5,884,221 A * | 3/1999 | Wortham | ...................... | 701/300 |
| 5,895,436 A | 4/1999 | Savoie et al. | | |
| 5,933,098 A * | 8/1999 | Haxton | .......................... | 340/945 |
| 5,986,543 A * | 11/1999 | Johnson | ................... | 340/426.19 |
| 6,184,801 B1 * | 2/2001 | Janky | ............................. | 340/988 |
| 6,330,438 B1 | 12/2001 | McClelland et al. | | |
| 6,803,861 B2 | 10/2004 | Flick | | |
| 6,970,081 B1 * | 11/2005 | Cheng | ........................... | 340/541 |
| 2002/0014978 A1 | 2/2002 | Flick | | |
| 2002/0163906 A1 | 11/2002 | Diachina et al. | | |
| 2003/0222813 A1 | 12/2003 | Boulay et al. | | |
| 2004/0005858 A1 | 1/2004 | Cervinka et al. | | |
| 2004/0075539 A1 | 4/2004 | Savoie et al. | | |

(Continued)

FOREIGN PATENT DOCUMENTS

DE    102004048668 A1    4/2006
EP        0167442 A2    1/1986

(Continued)

OTHER PUBLICATIONS

International Search Report dated Mar. 1, 2011, from corresponding International Patent Application No. PCT/US2010/060527.

(Continued)

*Primary Examiner* — Firmin Backer
*Assistant Examiner* — Nay Tun (57) ABSTRACT

A determination is made as to whether an expected signal has not been received from a stolen vehicle tracking (SVT) module in a vehicle. When the expected signal has not been received, at least one operating parameter of the vehicle is determined and based upon the at least one operating parameter, a reason for the absence of the expected signal is determined. Based upon the determined reason for the absence of the expected signal, it is then determined whether or not to issue an alarm.

12 Claims, 3 Drawing Sheets

(56) References Cited

U.S. PATENT DOCUMENTS

| | | | |
|---|---|---|---|
| 2005/0024203 A1* | 2/2005 | Wolfe | 340/539.22 |
| 2005/0090952 A1 | 4/2005 | Boulay et al. | |
| 2005/0136911 A1* | 6/2005 | Csapo et al. | 455/423 |
| 2006/0007039 A1 | 1/2006 | Duvall | |
| 2006/0267744 A1 | 11/2006 | Baumgartner et al. | |
| 2007/0049323 A1 | 3/2007 | Wang et al. | |
| 2007/0079376 A1 | 4/2007 | Robert et al. | |
| 2007/0200688 A1 | 8/2007 | Tang et al. | |
| 2008/0012731 A1* | 1/2008 | Krippgans | 340/989 |
| 2008/0186932 A1 | 8/2008 | Do et al. | |
| 2009/0167536 A1* | 7/2009 | Clark et al. | 340/573.4 |
| 2009/0247147 A1* | 10/2009 | Hadinata et al. | 455/421 |

FOREIGN PATENT DOCUMENTS

| | | | |
|---|---|---|---|
| EP | 1362753 A1 | 11/2003 | |
| EP | 1514444 A1 | 3/2005 | |
| EP | 1593564 A1 | 11/2005 | |
| EP | 1809057 A1 | 7/2007 | |
| EP | 2003818 A1 | 12/2008 | |
| EP | 2124428 A1 | 11/2009 | |
| GB | 2296843 A | 7/1996 | |
| GB | 2317418 A | 3/1998 | |
| GB | 2407455 A | 4/2005 | |
| GB | 2435987 A | 9/2007 | |
| GB | 2445046 A | 6/2008 | |
| GB | 2457102 A | 8/2009 | |
| WO | 95/33214 A1 | 12/1995 | |
| WO | 96/04155 A1 | 2/1996 | |
| WO | 00/21053 A1 | 4/2000 | |
| WO | 01/32481 A1 | 5/2001 | |
| WO | WO01/31797 A1 | 5/2001 | |
| WO | 03/103322 A1 | 12/2003 | |
| WO | 2005/112321 A1 | 11/2005 | |
| WO | 2006/092737 A2 | 9/2006 | |
| WO | 2007/019814 A1 | 2/2007 | |
| WO | 2007/028997 A2 | 3/2007 | |
| WO | WO 2007028997 A2 * | 3/2007 | |
| WO | 2008/111001 A2 | 9/2008 | |

OTHER PUBLICATIONS

International Search Report dated Jun. 1, 2011, from corresponding International Patent Application No. PCT/US2010/060723.
International Search Report dated Mar. 28, 2011, from corresponding International Patent Application No. PCT/US2010/060803.
International Search Report dated Apr. 15, 2011, from corresponding International Patent Application No. PCT/US2010/060773.
International Search Report dated Feb. 28, 2011, from corresponding International Patent Application No. PCT/US2010/060532.
International Search Report dated Mar. 1, 2011, from corresponding International Patent Application No. PCT/US2010/060750.
International Search Report dated May 13, 2011, from corresponding International Patent Application No. PCT/US2010/060675.
International Search Report dated Jun. 17, 2011, from corresponding International Patent Application No. PCT/US2010/060787.
International Search Report dated Mar. 10, 2011, from corresponding International Patent Application No. PCT/US2010/060811.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated May 24, 2011, from corresponding International Patent Application No. PCT/US2010/060518.
International Search Report dated Jun. 28, 2011, from corresponding International Patent Application No. PCT/US2010/060795.

* cited by examiner

APPARATUS AND METHOD FOR REDUCING FALSE ALARMS IN STOLEN VEHICLE TRACKING

CROSS REFERENCES TO RELATED APPLICATIONS

"Apparatus and Method of Detecting Jamming of Communications" having Ser. No. 12/643,049

"Apparatus and Method for Broadcasting the Detection of RF Jammer Presence" having Ser. No. 12/643,825

"Apparatus and Method for Compromised Vehicle Tracking" having Ser. No. 12/643,498

"Apparatus and Method for Detecting a Cloned Base Station" having Ser. No. 12/643,081

"Apparatus and Method for detecting Communication Interference" having Ser. No. 12/643,068

"Apparatus and Method for Detecting a Cloned Base Station" having Ser. No. 12/643,353

"Apparatus and Method for Determining an Invalid Base Station" having Ser. No. 12/643,463

"Apparatus and Method for Determining Vehicle Location" having Ser. No. 12/643,412

"Apparatus and Method for Maintaining Communication with a Stolen Vehicle Tracking Device" having Ser. No. 12/643,841

"Apparatus and Method for Tracking Stolen Vehicles " having Ser. No. 12/643,862

"Apparatus and Method for Maintaining Communications with a Vehicle in the Presence of Jamming" having Ser. No. 12/643,850 all of which are being filed on the same date as the present application and all of which having their contents incorporated herein by reference in their entireties.

FIELD OF THE INVENTION

The field of the invention relates to communications between various entities and, more specifically to detecting the jamming or attempted jamming of these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. Previous attempts at detecting such jamming and/or attempted jamming and reporting these actions to a security center have generally been unsuccessful and/or expensive to accomplish.

As mentioned, various approaches have been used to determine that a vehicle is stolen. Unfortunately, these approaches sometime suffer from the problem of false reports of vehicles being stolen. That is, the approaches determine that the vehicle is stolen for a particular reason when, in fact, the vehicle has not been stolen. This results in wasted resources since the authorities may track and recover a vehicle believed to be stolen when in fact it is not stolen.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where the reporting of false alarms as to a vehicle having its communication jammed or being stolen are significantly reduced or eliminated. The approaches described herein are easy to use, cost effective to implement, and reduce or eliminate false reports of stolen vehicles or vehicles having their communications jammed that waste resources.

In many of these embodiments, a determination is made as to whether an expected signal has not been received from a stolen vehicle tracking (SVT) module in a vehicle. When the expected signal has not been received, at least one operating parameter of the vehicle is determined and based upon the at least one operating parameter, a reason for the absence of the expected signal is determined. Based upon the determined reason for the absence of the expected signal, it is then determined whether or not to issue an alarm.

The operating parameter of the vehicle can be selected from a variety of different parameters. For instance, the operating parameter may include a vehicle location, a time of day, and a quality of a coverage area of the vehicle. This information may be obtained from various sources such as the vehicle or a system database. Other examples of operating parameters and information sources are possible.

The determined reason for the non-reception may also vary. For example, the reason may be a poor coverage area of the vehicle, that the vehicle is parked, or that the vehicle is stolen. Other examples are possible.

The expected communication may be received over a wide variety of channels or channel types. For example, the expected signal may be transmitted over a traffic channel in a cellular network. In addition, the expected signal is transmitted periodically and may include any number of reports. For example, the expected signal may include at least two consecutive reports. In another example, the expected signal comprises one report that is expected to be received at a predetermined time.

In others of these embodiments, an apparatus for reducing false alarms in stolen vehicle tracking (SVT) applications includes an interface and a controller. The interface includes an input and an output. The controller is coupled to the interface and is configured to determine whether an expected signal has not been received from a stolen vehicle tracking (SVT) module at the input of the interface. The controller is further configured to when the expected signal has not been received, determine at least one operating parameter of the vehicle and based upon the at least one operating parameter, and determine a reason for the absence of the expected signal. The controller is further configured to based upon the determined reason for the absence of the expected signal, determine whether to issue an alarm at the output of the interface.

Figure 1:
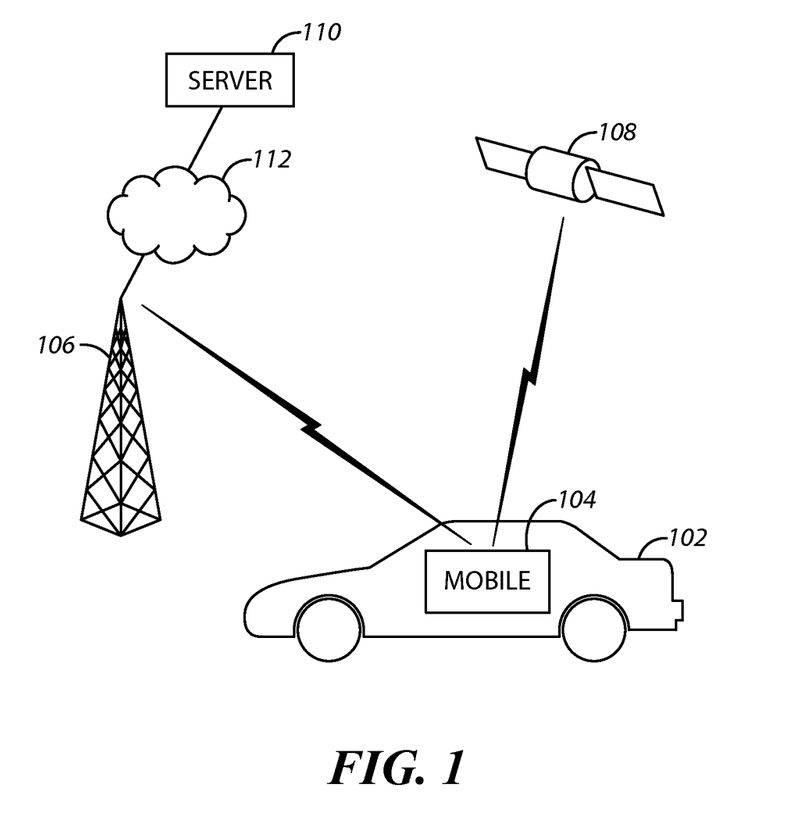
FIG. 1 comprises a block diagram of a system that reduces the reporting of false stolen vehicle reports and/or false jamming reports according to various embodiments of the present invention.

Referring now to FIG. 1, one example of a system for detecting the jamming of vehicular communications is described. A vehicle 102 includes a stolen vehicle tracking (SVT) module 104. The stolen vehicle tracking (SVT) module 104 is disposed anywhere in or at the vehicle and communicates with a base station 106 and an external navigation system 108. A server 110 couples to the base station 106 through, for example, a network infrastructure 112. The network infrastructure 112 includes appropriate devices such as servers, routers, and base stations as known to those skilled in the art and will not be discussed in greater detail here.

The stolen vehicle tracking (SVT) module 104 may be, in one example, a programmed electronic device that determines the location of the vehicle 102 from signals received from the navigation system 108. The stolen vehicle tracking (SVT) module 104 may also determine if jamming and/or attempted jamming is occurring as to signals being received and/or being transmitted and report this to the owner of the vehicle. The stolen vehicle tracking (SVT) module 104 may also be or include any type of mobile device (e.g., embedded cellular phone, non-embedded cellular phone, personal digital assistant, pager, to name several examples) that do not determine jamming or receive signals from the external navigation system 108. The external navigation system 108 may be a GPS satellite or satellite system, in one example.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The stolen vehicle tracking (SVT) module 104 is any type of communication device that communicates with entities outside the vehicle 102 using any type of communication technology or protocol. For example, the module 104 may be or may incorporate a cellular phone, transponder, radio, or some combination of these or other devices.

Any number of antennas may be used by the module 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

The server 110 may in one example be any combination of electronic hardware or software that is used to determine whether a vehicle is stolen. The server 110 may determine if an expected signal has been received and then, if the signal has not been received determine a reason for the absence of the signal. If the determined reason is that the vehicle is stolen, the server 110 may issue an alarm to the appropriate authorities. If the determined reason indicates that vehicle is not stolen or jammed (or not likely to be stolen or jammed) then no alarm is issued.

In operation, the vehicle 102 periodically reports its status to the server 110 (e.g., located with a service provider) using the infrastructure of a cellular network, for instance. In one example if the server 110 does not receive a status update (e.g., a periodic status update) it will determine that communications with vehicle are really jammed and alert appropriate agencies or authorities. In another example, the absence of a GSM location update message may be used to determine the occurrence of jamming.

In some of these examples, two operating modes exist. In the first mode the vehicle 102 is parked and in the second mode the vehicle 102 can be moving or is parked (after moving). Other modes of operation may also exist and it will be understood that the two modes mentioned here are examples only. In the following example, the module 104 is an embedded cellular phone within the vehicle 102.

In the first mode (car is parked) the vehicle 102 periodically transmits an update to the server 110. In one case, the server 110 will infer that the vehicle 102 is being jammed and/or is being stolen if the vehicle stops reporting.

In either mode, the vehicle 102 (via the stolen vehicle tracking (SVT) module 104) periodically reports some or all of various types of information every Tr 1 minutes: vehicle ID, location information, signal strength, network id, cell id of the network registered on, vehicle speed and direction, ignition status, and embedded phone's standby duration and planned power mode changes. Optionally, the vehicle 102 can report accidents and request roadside assistance.

The server 110 computes the location of the vehicle 102 based upon the last location update, vehicle velocity and direction, or other factors. If the server 110 updates the navigation services or is aware of the planned route of the vehicle 102, then the route may be used to improve vehicle location determination.

In some examples, the server 110 maintains a data base of poor coverage areas. The poor coverage data base could be based upon, database of the cellular service provider's base station via the information provided by the cellular service and/or the cellular conditions being reported by the vehicle. The server 110 determines the cellular condition at the location of the vehicle 102. As used herein, "cellular condition" refers to any parameter related to the cellular operating conditions at a particular location such as they coverage available at that location or the quality of that coverage.

It will be appreciated that the determination as to whether signal conditions or coverage are "good" or "bad" may be based upon a variety of different factors. For example, signal strength conditions or signal quality conditions may be monitored within a given area and if signal conditions are above a predetermined threshold, they may be considered good (or adequate) while if the fall below a certain threshold they may be consider bad (or inadequate). Further, the server may store and map these conditions as mentioned herein.

The server 110 may also be aware of the power mode and the timing of the power cycling of the stolen vehicle tracking (SVT) module 104 (e.g., an embedded phone). This information may be used by the system to reduce power consumption when the ignition of the vehicle 102 is off For example, the phone may be powered on (e.g., standby duration) for the first 48 hours after the ignition is turned off After that time, it may be powered up for one minute every ten minutes to mention a few examples.

The power mode information of the module 104 may be conveyed to the server 110 in messages from the vehicle, or the server 110 may have a prior knowledge of the times that the power mode will change. In addition, the server 110 may include a record of whether roadside assistance has been requested for the vehicle 102.

In car parked mode, the vehicle 102 sends periodically an update to the sever 110. If the server 110 does not receive Nr consecutive reports from the vehicle it can undertake a variety of different actions.

If the embedded phone is known to be on and if the cellular connections at the vehicle's location are known to be good then it is inferred that the vehicle 102 is jammed. The server 110 notifies the appropriate agencies and/or takes other corrective actions.

If the embedded phone is known to be on, but the signal conditions are poor at the location of the vehicle 102, the server marks that the vehicle is in poor coverage and notifies the appropriate agencies. If the embedded phone is known to be off, no action is taken.

If the vehicle 102 is moving (the location is changing), and there is no roadside assistance request pending, the vehicle 102 is being stolen. The server 110 notifies appropriate agencies and/or takes other corrective actions.

In car parked or moving mode, the vehicle 102 can be tracked while moving and monitored when it is parked. If the server 110 does not receive Nr consecutive reports from the vehicle 102, the server 110 may under take a number of actions.

If the embedded phone is known to be on and if the cellular conditions at the vehicle's location are good, the vehicle 102 is inferred to be jammed. The server 110 notifies the appropriate agencies and/or takes other corrective actions. In any of the approaches described herein the embedded phone (or other communication device) may be determine to be on if it has registered with the system. Conversely, the embedded phone (or other communication device) may be determine to be off if it has de-registered with the system.

If the embedded phone is known to be on but the signal conditions are poor at the location of the vehicle 102 , the server marks that the vehicle is in a poor coverage area and notifies the appropriate authorities or agencies. If the embedded phone is known to be off, then no action is taken.

In another example of the operation of the system of FIG. 1, a determination is made as to whether an expected signal has not been received from the stolen vehicle tracking (SVT) module 104 in the vehicle 102. When the expected signal has not been received, at least one operating parameter of the vehicle 102 is determined and based upon the at least one operating parameter, a reason for the absence of the expected signal is determined. Based upon the determined reason for the absence of the expected signal, it is then determined whether or not to issue an alarm.

In some examples, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels, jamming is determined to be occurring. The threshold can be based upon map data provided by a system or device that is disposed external to the communication device 104 and/or developed by the device 104 from previous readings (e.g., previous drives) to name two approaches.

Figure 2:
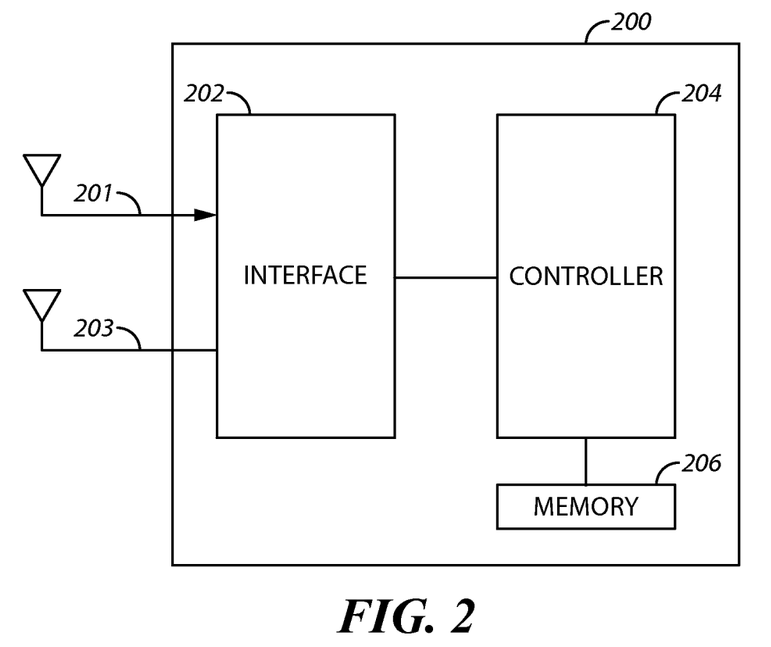
FIG. 2 comprises a block diagram of an apparatus such as a server that reduces the reporting of false stolen vehicle reports and/or false jamming reports according to various embodiments of the present invention.

Referring now to FIG. 2, an apparatus 200 for reducing false alarms in stolen vehicle tracking (SVT) applications includes an interface 202 and a controller 204. In one example, the apparatus is the server 110 of FIG. 1.

The interface 202 includes an input 201 and an output 203. The controller 204 is coupled to the interface 202 and is configured to determine whether an expected signal has not been received from a stolen vehicle tracking (SVT) module at the input 201 of the interface 202.

The controller 204 is further configured to when the expected signal has not been received, determine at least one operating parameter of the vehicle and based upon the at least one operating parameter, determine a reason for the absence of the expected signal. The controller 204 is further configured to, based upon the determined reason for the absence of the expected signal, determine whether to issue an alarm at the output 203 of the interface 202.

The apparatus also includes a memory 206 that couples to the controller 204. In some examples, the memory 206 maintains information regarding poor coverage areas. The poor coverage data base could be based upon, database of the cellular service provider's base station via information provided by the cellular service and/or the cellular conditions being reported by the vehicles.

The memory 206 may also store power mode and the timing of the power cycling of stolen vehicle tracking (SVT) modules located. This information may be used by the system to reduce power consumption when the ignition of the vehicle is off. The memory 206 may also store information relating to whether a particular mobile unit (e.g., SVT module) is on or off. The memory may store other types of information as well.

Figure 3:
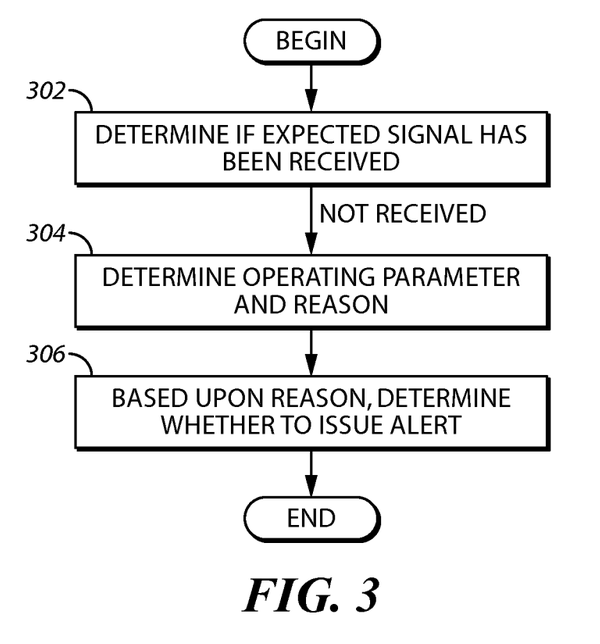
FIG. 3 comprises a flowchart of an example of an approach that reduces the reporting of false stolen vehicle reports and/or false jamming reports according to various embodiments of the present invention.

Referring now to FIG. 3, one example of an approach for reducing false reports of stolen vehicles is described. At step 302, a determination is made as to whether an expected signal has not been received from a stolen vehicle tracking (SVT)

module in a vehicle. For example, a server may expect to receive periodic status update from a communication device in a vehicle.

At step 304, when the expected signal has not been received, at least one operating parameter of the vehicle is determined and based upon the at least one operating parameter, a reason for the absence of the expected signal is determined. For example, the activation of the mobile unit in the vehicle and/or the coverage area quality of where the mobile unit are determined. The trigger as to whether an expected signal has been received may be the non-receipt of one signal or message at one time. Alternatively, in other examples, the trigger may be the non-receipt or two or more messages at two or more different times.

At step 306, based upon the determined reason for the absence of the expected signal, it is then determined whether or not to issue an alarm. For example, the activation of the mobile unit in the vehicle and/or the coverage area quality of where the mobile unit may be used to determine whether a warning should issue to the appropriate authorities. The authorities can then take appropriate action such as attempt to recover the vehicle if stolen or attempt to intervene an halt any jamming attempts. The owner of the vehicle may also be informed of the warning.

Figure 4:
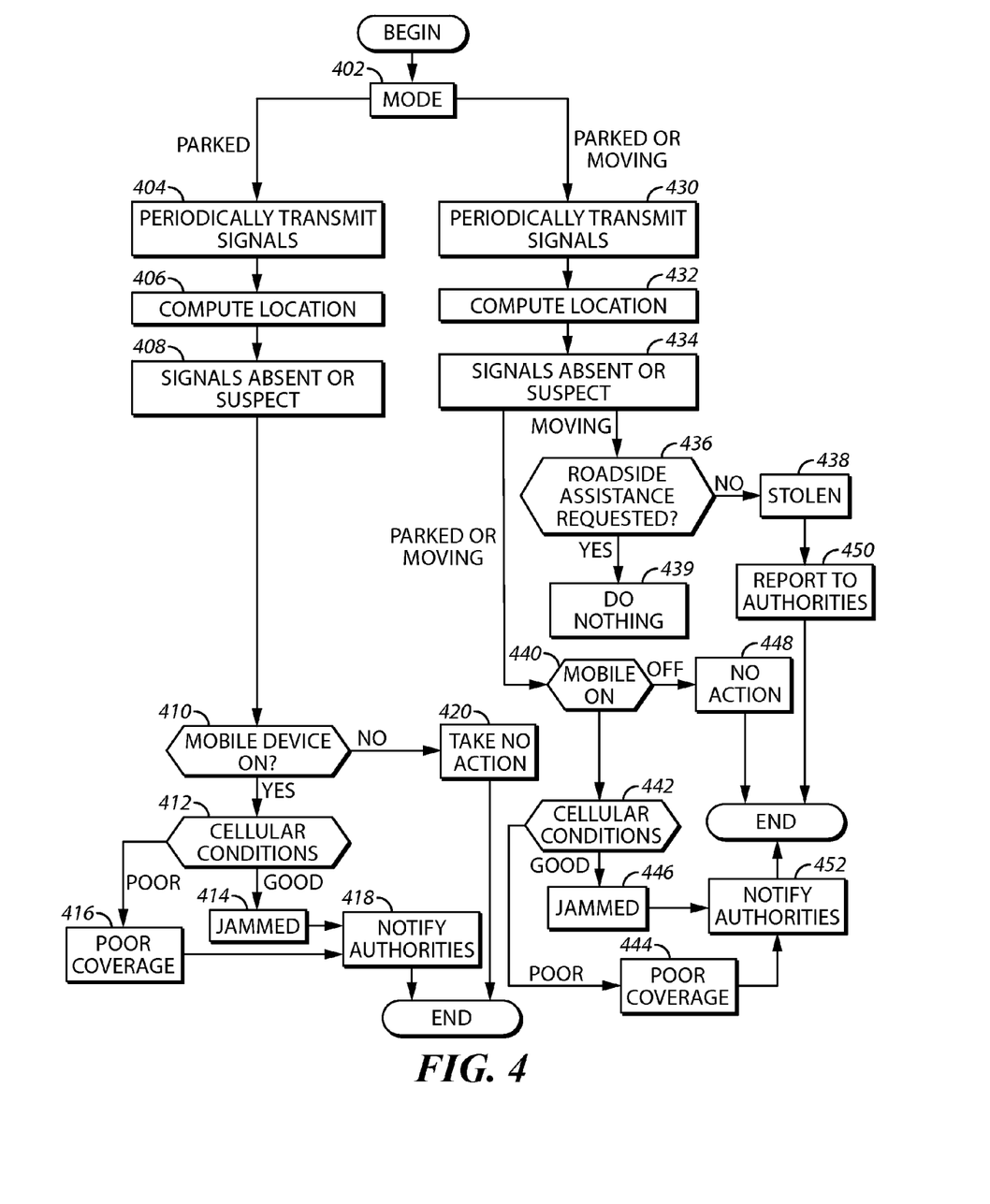
FIG. 4 comprises a flowchart of an example of an approach that reduces the reporting of false stolen vehicle reports and/or false jamming reports according to various embodiments of the present invention.

Referring now to FIG. 4, one example of approaches to determine whether or not to issue emergency messages or take other appropriate action when jamming is suspected are described. In the approaches described with respect to FIG. 4, a mobile unit is located at or within a vehicle. As mentioned above, the mobile unit may be an embedded cellular phone, other cellular phone, or the like. It may also include or perform SVT tracking functions and, in some examples, may itself determine if jamming is occurring. It will also be understood that although FIG. 4 is described as implementing two modes of operation, other modes of operation may also exist and it will be understood that the two modes described here are examples only.

At step 402, it is determined which mode exists within the system. In the first mode the vehicle is parked (and control continues at step 404) and in the second mode the vehicle can be moving or is parked (and execution continues at step 430).

In the first mode (car is parked) at step 404, the vehicle periodically transmits an update to the server. At step 406, the sever computes the location of the vehicle based upon the last location update, vehicle velocity and direction, or other factors. If the server updates the navigation services or is aware of the planned route of the vehicle, then the route may be used to improve vehicle location determination.

In one case, the server will infer that that the vehicle is potentially being jammed and/or is being stolen if the vehicle stops reporting at step 408. Whether the vehicle is actually being jammed may be depend upon parameters such as the coverage quality of the vehicle or whether the mobile unit is on or off.

In some examples, the server maintains a data base of poor coverage areas. The poor coverage data base could be based upon, database of the cellular service provider's base station via the information provided by the cellular service and/or the cellular conditions being reported by the vehicles. The server determines the cellular condition at the location of the vehicle.

The server may also be aware of the power mode and the timing of the power cycling of the mobile device (e.g., an embedded phone) in the vehicle. This information may be used by the system to reduce power consumption when the ignition of the vehicle is off. For example, the phone may be powered on (e.g., standby duration) for the first 48 hours after the ignition is turned off. After that time, it may be powered up for one minute every ten minutes to mention a few examples.

The embedded phone power mode information may be conveyed to the server in messages from the vehicle, or the server may have a prior knowledge of the times that the power mode will change. In addition, the server may include a record of whether roadside assistance has been requested for the vehicle.

If the mobile device is known to be on (determined at step 410) and if the cellular connections at the vehicle's location are known to be good (determined at step 412) then it is inferred that the vehicle is jammed at step 414. At step 418, the server notifies the appropriate agencies and/or takes other corrective actions.

If the embedded phone is known to be on (determined at step 410), but the signal conditions are poor at the location of the vehicle (determined at step 412), the server marks that the vehicle is in poor coverage at step 416 and notifies the appropriate agencies at step 418. If the mobile device is known to be off (determined at step 410), no action is taken at step 420. Execution then ends.

It will be appreciated that the determination as to whether signal conditions are "good" or "bad" may be based upon a variety of different factors. For example, signal strength conditions or signal quality conditions may be monitored within a given area and if signal conditions are above a predetermined threshold, they may be considered good (or adequate) while if the fall below a certain threshold they may be consider bad (or inadequate). Further, the server may store and map these conditions as mentioned herein.

In car parked or moving mode (determined at step 402), this mode can be used for tracking the vehicle in addition to monitoring the vehicle when it is parked. At step 430, periodic reports are transmitted from the mobile unit. At step 432, location of the mobile unit can be determined. At step 434, if the server does not receive Nr consecutive reports from the vehicle, the server may under take a number of actions.

If the vehicle is moving (the location is changing), and there is no roadside assistance request pending (as determined at step 436), the vehicle is determined as being stolen at step 438. At step 450, the server notifies appropriate agencies and/or takes other corrective actions.

If the mobile unit is known to be on (as determined at step 440) and if the cellular conditions at the vehicle's location are good (as determined at step 442), the vehicle is inferred to be jammed at step 446. The server notifies the appropriate agencies and/or takes other corrective actions at step 452.

If the mobile device is known to be on (as determined at step 440) but the signal conditions are poor at the location of the vehicle (as determined at step 442), the server marks that the vehicle is in a poor coverage area at step 444 and notifies the appropriate authorities or agencies at step 452. If the mobile device is known to be off (as determined at step 440), then no action is taken at step 448 and execution ends.

Thus, approaches are provided where the reporting of false alarms can be significantly reduced or eliminated when an expected signal from a vehicle is not received. Various parameters associated with a mobile unit in a vehicle may be considered together with the absence of an expected signal from the mobile unit in the vehicle to determine if a warning should issue to the appropriate authorities that communications to the vehicle are being jammed and/or the vehicle is being stolen. The approaches described herein are easy to use, cost effective to implement, and reduce or eliminate false reports of stolen vehicles that waste system resources.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of reducing false alarms in stolen vehicle tracking (SVT) applications, the method comprising:
   determining whether an expected signal has not been received from a stolen vehicle tracking (SVT) module in a vehicle;
   when the expected signal has not been received, determining at least one operating parameter of the vehicle and based upon the at least one operating parameter, determining a reason for the absence of the expected signal;
   based upon the determined reason for the absence of the expected signal, determining whether or not to issue a stolen-vehicle-tracking alarm, which indicates that the vehicle is stolen or that the expected signal is jammed, such that:
      the alarm is issued if the determined reason is that the vehicle is determined to be stolen;
      the alarm is issued if the determined reason is that the expected signal is determined to be jammed; and
      the alarm is not issued if the determined reason indicates that the vehicle is not stolen and that the expected signal is not jammed;
   wherein the determined reason is that the vehicle is determined to be stolen further comprises determining that the vehicle is moving and that there is no roadside assistance request pending;
   wherein the determined reason is that the expected signal is determined to be jammed further comprises determining that an embedded phone in the vehicle with the SVT module is known to be on and that the cellular connections at the vehicle's location are known to be good.

2. The method of claim 1, wherein the determined reason is that the expected signal is determined to be jammed further comprises determining that the signal from the SVT module stopped while the vehicle was not moving.

3. The method of claim 1, wherein the determined reason is that the expected signal is determined to be jammed further comprises determining that the signal from the SVT module varies beyond a threshold amount from an expected range of signal levels in an area of known good signal strength.

4. The method of claim 1, wherein the determined reason indicates that the vehicle is not stolen and that the expected signal is not jammed when an embedded phone in the vehicle is known to be off.

5. An apparatus for reducing false alarms in stolen vehicle tracking (SVT) applications, comprising:
   an interface with an input and an output; and
   a controller coupled to the interface, the controller being configured to:
   determine whether an expected signal has not been received from a stolen vehicle tracking (SVT) module in a vehicle;
   when the expected signal has not been received, determine at least one operating parameter of the vehicle and based upon the at least one operating parameter, determine a reason for the absence of the expected signal;
   based upon the determined reason for the absence of the expected signal, determine whether or not to issue a stolen-vehicle-tracking alarm, which indicates that the vehicle is stolen or that the expected signal is jammed, such that:
      the alarm is issued if the determined reason is that the vehicle is determined to be stolen;
      the alarm is issued if the determined reason is that the expected signal is determined to be jammed; and
      the alarm is not issued if the determined reason indicates that the vehicle is not stolen and that the expected signal is not jammed;
   wherein the determined reason is that the vehicle is determined to be stolen further comprises determining that the vehicle is moving and that there is no roadside assistance request pending;
   wherein the determined reason is that the expected signal is determined to be jammed further comprises determining that an embedded phone in the vehicle with the SVT module is known to be on and that the cellular connections at the vehicle's location are known to be good.

6. The apparatus of claim 5, wherein the determined reason is that the expected signal is determined to be jammed further comprises determining that the signal from the SVT module stopped while the vehicle was not moving.

7. The apparatus of claim 5, wherein the determined reason is that the expected signal is determined to be jammed further comprises determining that the signal from the SVT module varies beyond a threshold amount from an expected range of signal levels in an area of known good signal strength.

8. The apparatus of claim 5, wherein the determined reason indicates that the vehicle is not stolen and that the expected signal is not jammed when an embedded phone in the vehicle with the SVT module is known to be off.

9. A computer readable non-transitory medium having stored thereon computer executable instructions that when executed by a processor reduce false alarms in stolen vehicle tracking (SVT) applications by performing operations comprising:
   determining whether an expected signal has not been received from a stolen vehicle tracking (SVT) module in a vehicle;
   when the expected signal has not been received, determining at least one operating parameter of the vehicle and based upon the at least one operating parameter, determining a reason for the absence of the expected signal;
   based upon the determined reason for the absence of the expected signal, determining whether or not to issue a stolen-vehicle-tracking alarm, which indicates that the vehicle is stolen or that the expected signal is jammed, such that:
      the alarm is issued if the determined reason is that the vehicle is determined to be stolen;
      the alarm is issued if the determined reason is that the expected signal is determined to be jammed; and
      the alarm is not issued if the determined reason indicates that the vehicle is not stolen and that the expected signal is not jammed;
   wherein the determined reason is that the vehicle is determined to be stolen further comprises determining that the vehicle is moving and that there is no roadside assistance request pending;
   wherein the determined reason is that the expected signal is determined to be jammed further comprises determining that an embedded phone in the vehicle with the SVT module is known to be on and that the cellular connections at the vehicle's location are known to be good.

10. The computer readable non-transitory medium of claim 9, wherein the determined reason is that the expected signal is determined to be jammed further comprises determining that the signal from the SVT module stopped while the vehicle was not moving.

11. The computer readable non-transitory medium of claim 9, wherein the determined reason is that the expected signal is determined to be jammed further comprises determining that the signal from the SVT module varies beyond a threshold amount from an expected range of signal levels in an area of known good signal strength.

12. The computer readable non-transitory medium of claim 9, wherein the determined reason indicates that the vehicle is not stolen and that the expected signal is not jammed when an embedded phone in the vehicle is known to be off.

* * * * *